United States Patent
Ciechanowski et al.

(10) Patent No.: US 10,825,129 B2
(45) Date of Patent: Nov. 3, 2020

(54) ELIMINATING OFF SCREEN PASSES USING MEMORYLESS RENDER TARGET

(71) Applicant: Apple Inc., Cupertino, CA (US)

(72) Inventors: Bartosz Ciechanowski, Cupertino, CA (US); Michael Imbrogno, Cupertino, CA (US); Gokhan Avkarogullari, San Jose, CA (US); Nathaniel C. Begeman, Cupertino, CA (US); Sean M. Gies, Cupertino, CA (US); Michael J. Swift, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 15/467,268

(22) Filed: Mar. 23, 2017

(65) Prior Publication Data
US 2017/0358054 A1    Dec. 14, 2017

Related U.S. Application Data

(60) Provisional application No. 62/444,279, filed on Jan. 9, 2017, provisional application No. 62/349,024, filed on Jun. 12, 2016.

(51) Int. Cl.
*G06T 1/00* (2006.01)
*G06T 1/60* (2006.01)
*G06T 1/20* (2006.01)
*G06T 15/00* (2011.01)

(52) U.S. Cl.
CPC .................. *G06T 1/60* (2013.01); *G06T 1/20* (2013.01); *G06T 15/005* (2013.01)

(58) Field of Classification Search
CPC ............ G06T 1/20; G06T 1/60; G06T 15/005
See application file for complete search history.

(56) References Cited

U.S. PATENT DOCUMENTS

| | | | |
|---|---|---|---|
| 9,053,040 B2 | 6/2015 | Surti | |
| 9,183,651 B2 | 11/2015 | Hinitz | |
| 9,280,956 B2 | 3/2016 | Seetharamaiah | |
| 2003/0076329 A1* | 4/2003 | Beda | G06T 15/00 345/557 |
| 2003/0169269 A1 | 9/2003 | Sasaki | |
| 2006/0204119 A1* | 9/2006 | Feng | G06F 17/147 382/250 |
| 2009/0109219 A1* | 4/2009 | DeCoro | G06T 17/20 345/423 |
| 2009/0228782 A1* | 9/2009 | Fraser | G06F 16/9577 715/234 |
| 2012/0306912 A1* | 12/2012 | Blanco | G06F 3/1454 345/629 |
| 2013/0328895 A1 | 12/2013 | Sellers | |

(Continued)

*Primary Examiner* — Charles Tseng
(74) *Attorney, Agent, or Firm* — Blank Rome LLP

(57) ABSTRACT

One disclosed embodiment is directed to graphics processing method for displaying a user interface. The method includes executing a plurality of graphic processing operation in a single rendering pass. The rendering pass includes several render targets. At least one of the render targets is designated as a memory-less render target. The memory-less render target is used to store intermediate data. The intermediate data is combined with the outcome of at least one other graphics processing operation to generate a combined result. The combined result is stored in the frame buffer memory for display.

29 Claims, 11 Drawing Sheets

(56) References Cited

U.S. PATENT DOCUMENTS

| | | |
|---|---|---|
| 2014/0184626 A1 | 7/2014 | Narayanan |
| 2015/0029203 A1* | 1/2015 | Surti ........................ G09G 5/36 345/531 |
| 2015/0049104 A1* | 2/2015 | Lum ........................ G06T 1/60 345/552 |
| 2016/0133029 A1 | 5/2016 | Akenine-Moller |

* cited by examiner

| 370 APPLICATION A | 371 PHOTOS | 372 QUICKEN | 373 IMOVIE | 374 APPLICATION B |
|---|---|---|---|---|
| 360 OTHER APPLICATION SERVICES | 361 SPRITEKIT | 362 SCENE KIT | 363 CORE ANIMATION | 364 CORE GRAPHICS |
| 350 O/S SERVICES | 351 OPENGL | 352 METAL | 353 SOFTWARE RAYTRACER | 354 SOFTWARE RASTERIZER |
| O/S KERNEL 345 | | | | |
| HARDWARE 340 | | | | |

ELIMINATING OFF SCREEN PASSES USING MEMORYLESS RENDER TARGET

PRIORITY

This application claims the benefit of U.S. Provisional Patent Application No. 62/349,024; filed Jun. 12, 2016; and entitled TEXTURE NOT BACKED BY REAL MAPPING; the entire contents of which is incorporated herein by reference.

This application claims the benefit of U.S. Provisional Patent Application No. 62/444,279; filed Jan. 9, 2017; and entitled ELIMINATING OFF SCREEN PASSES USING MEMORYLESS RENDER TARGET; the entire contents of which is incorporated herein by reference.

BACKGROUND

The inventions disclosed herein relate to the field of graphic processing. More specifically, but not by way of limitation, it relates to memory allocation techniques for use by graphic processing units in rendering graphic data for display.

Computers and other computational devices typically have at least one programmable processing element that is generally known as a central processing unit (CPU). They frequently also have other programmable processors that are used for specialized processing of various types, such as graphic processing operations which are typically called graphic processing units (GPUs). GPUs generally comprise multiple cores or processing elements designed for executing the same instruction on parallel data streams, making them more effective than general-purpose CPUs for algorithms in which processing of large blocks of data is done in parallel. In general, a CPU functions as the host and hands-off specialized parallel tasks to the GPUs.

Vendors and standards organizations have created application programming interfaces (APIs) that make graphic data-parallel tasks easier to program because of the high level of developer programming interaction. Graphic application executed on the computational devices convey description of a graphic scene by invoking application programming interface (API) calls to GPUs in order to render an image for display.

Sometimes several rendering passes may be employed prior to committing a frame buffer's content for display. The multiple rendering passes are employed to incrementally move the data toward its displayable format. For example, effects such as lighting, shadows, reflections, specular illumination may be sequentially applied to the same graphic element. An on-chip memory may be used by a GPU to store the intermediate results temporarily while the data is also backed up in the system memory. Later rendering passes in a sequence of rendering passes may access the intermediate results stored in the system memory for further computation. As the foregoing application demonstrates, a more efficient memory allocation approach is needed in rendering graphic data by GPUs.

SUMMARY

One disclosed embodiment includes memory allocation methods for use by a graphic processing unit in rendering graphic data for display. The method includes receiving a buffer attachment associated with a first rendering pass, where the hardware prerequisites for operation of the first rendering pass are determined. The method also includes receiving an indication to not allocate system memory for the received buffer attachment. Thereafter, it may be determined whether the received buffer attachment will be loaded from or stored to by the subsequent rendering passes. If it is determined that the buffer attachment will be accessed by a subsequent rendering pass, an error message may be generated indicating that system memory must be allocated. If it is determined that a subsequent rendering pass will not access the buffer attachment, the buffer attachment is rendered without allocating system memory.

In one embodiment, in response to the determination that the subsequent rendering passes do not access the received buffer attachment, memory space in system memory is dynamically allocated for rendering the received buffer attachment. In one embodiment, to avoid partial rendering, the method includes monitoring a remaining allocated space in the system memory, suspending the rendering of the received buffer attachment when the remaining available memory space reaches a specific threshold, allocating additional memory space for the rendering of the received buffer attachment, and resuming the rendering of the received buffer attachment.

BRIEF DESCRIPTION OF THE DRAWINGS

FIG. 3 is a block diagram showing an illustrative software architecture diagram according to one or more embodiments of the disclosed subject matter.

DETAILED DESCRIPTION

Figure 1:
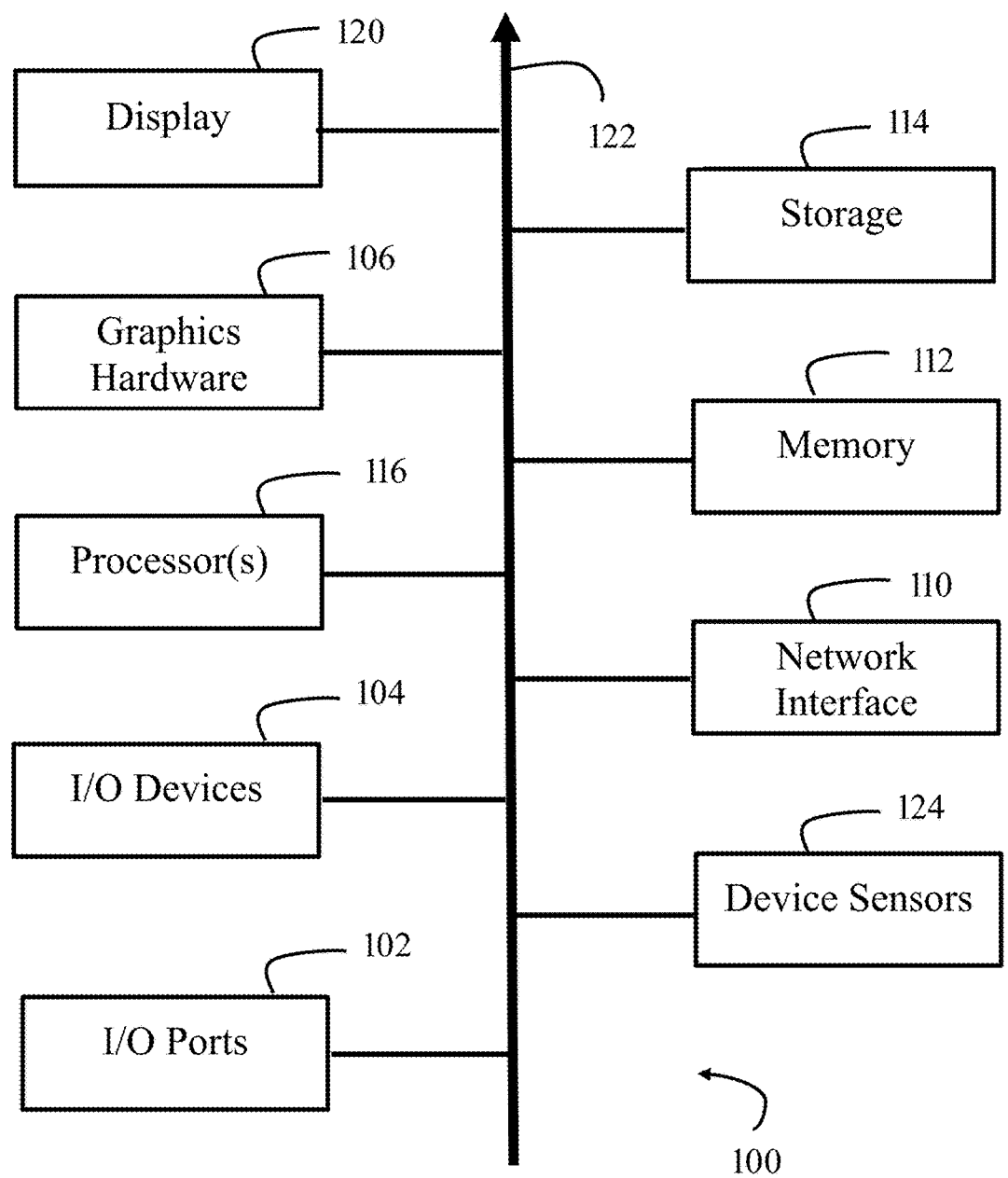
FIG. 1 is a block diagram illustrating a computer system that may be used, for example, as an end-user or developer computer system.

A graphic processing unit (GPU) is a specialized electronic circuit designed to rapidly manipulate and alter memory to accelerate the creation of images in a frame buffer typically intended for output to a display. A GPU is efficient at manipulating computer graphic and has a highly parallel structure that makes it more efficient than a general-purpose computer processor (CPU) where processing of large blocks of data is done in parallel.

Embodiments described in more details below provide a more efficient memory allocation technique in processing graphic data for display. More specifically, an embodiment of the disclosed subject matter describes allocating only on-chip memory, without a system memory backup, for the buffer attachments that are renderable in one rendering pass. Features of the disclosed subject matter allow a reduction of the bandwidth traffic and memory usage in rendering graphic data by GPUs.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer system or a plurality of computer systems working together to perform the function described as being performed on or by a computer system. Similarly, a machine-readable medium can refer to a single physical medium or a plurality of media that may together contain the indicated information stored thereon. A processor can refer to a single processing element or a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of systems having the benefit of this disclosure and being of ordinary skill in the design and implementation of computing systems and/or graphic systems.

Referring to FIG. 1, the disclosed embodiments may be performed by representative Computer System 100. For example the representative Computer System 100 may act as a software development platform or an end-user device. While FIG. 1 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems and other consumer electronic devices, etc.) which have fewer components or perhaps more components may also be used to implement one or more embodiments.

As illustrated in FIG. 1, computer System 100, which is a form of a data processing system, includes Bus 122 which is coupled to Processor(s) 116, which may be CPUs and/or GPUs, Memory 112, which may include one or both of a volatile read/write random access memory (RAM) and a read-only memory (ROM), and non-volatile Storage Device 114. Processor(s) 116 may retrieve instructions from Memory 112 and Storage Device 114 and execute the instructions to perform operations described herein. Bus 122 interconnects these various components together and also interconnects Processor 116, Memory 112, and Storage Device 114 to Display Device 120, I/O ports 102 and peripheral devices such as input/output (I/O) devices 104 which may be pointing devices such as a mouse or stylus, keyboards, touch screens, modems, network interfaces, printers and other devices which are well known in the art. Typically, Input/output Devices 104 are coupled to the system through an input/output controller(s).

Computer System 100 may also have Device Sensors 124, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, Global Positioning Systems (GPS), microphones, CCDs (or other image sensors), infrared sensors, thermometers, etc. These and other sensors may work in combination with one or more GPUs, digital signal processors (DSPs), or conventional microprocessors along with appropriate programming so the sensor outputs may be properly interpreted and/or combined and interpreted.

Device Sensors 124 may capture contextual and/or environmental phenomena such as time; location information; the status of the device with respect to light, gravity, a magnetic field (e.g., a magnemometer); and even still and video images. In addition, network-accessible information, such as weather information, may also be used as part of the context. All captured contextual and environmental phenomena may be used to provide context to user activity or information about user activity. For example, in accessing a gesture or the expression or emotion of a user, the contextual information may be used as part of the contextual analysis. Computer System 100 may react to environmental and contextual actions and reflect a reaction in real-time on the display system through use of the Graphic Hardware 106.

Where volatile RAM is included in Memory 112, the RAM is typically implemented as dynamic RAM (DRAM), which requires continuous power in order to refresh or maintain the data in the memory. Graphic Hardware 106 may be special purpose computational hardware for processing graphic and/or assisting Processor 116 in performing computational tasks. In some embodiments, Graphic Hardware 106 may include CPU-integrated graphic and/or one or more programmable GPUs.

Storage Device 114 is typically a magnetic hard drive, an optical drive, a non-volatile solid-state memory device, or other types of memory systems, which maintain data (e.g. large amounts of data) even after power is removed from the system (i.e., non-volatile). While FIG. 1 shows that Storage Device 114 is a local device coupled directly to the rest of the components in the data processing system, embodiments may utilize a non-volatile memory which is remote from the system, such as a network storage device which is coupled to the data processing system through Network Interface 110, which may be a wired or wireless networking interface.

Bus 122 may include one or more links connected to each other through various bridges, controllers, and/or adapters as is well known in the art. Although only a single element of each type is illustrated in FIG. 1 for clarity, multiple elements of any or all of the various element types may be used as desired.

Figure 2:
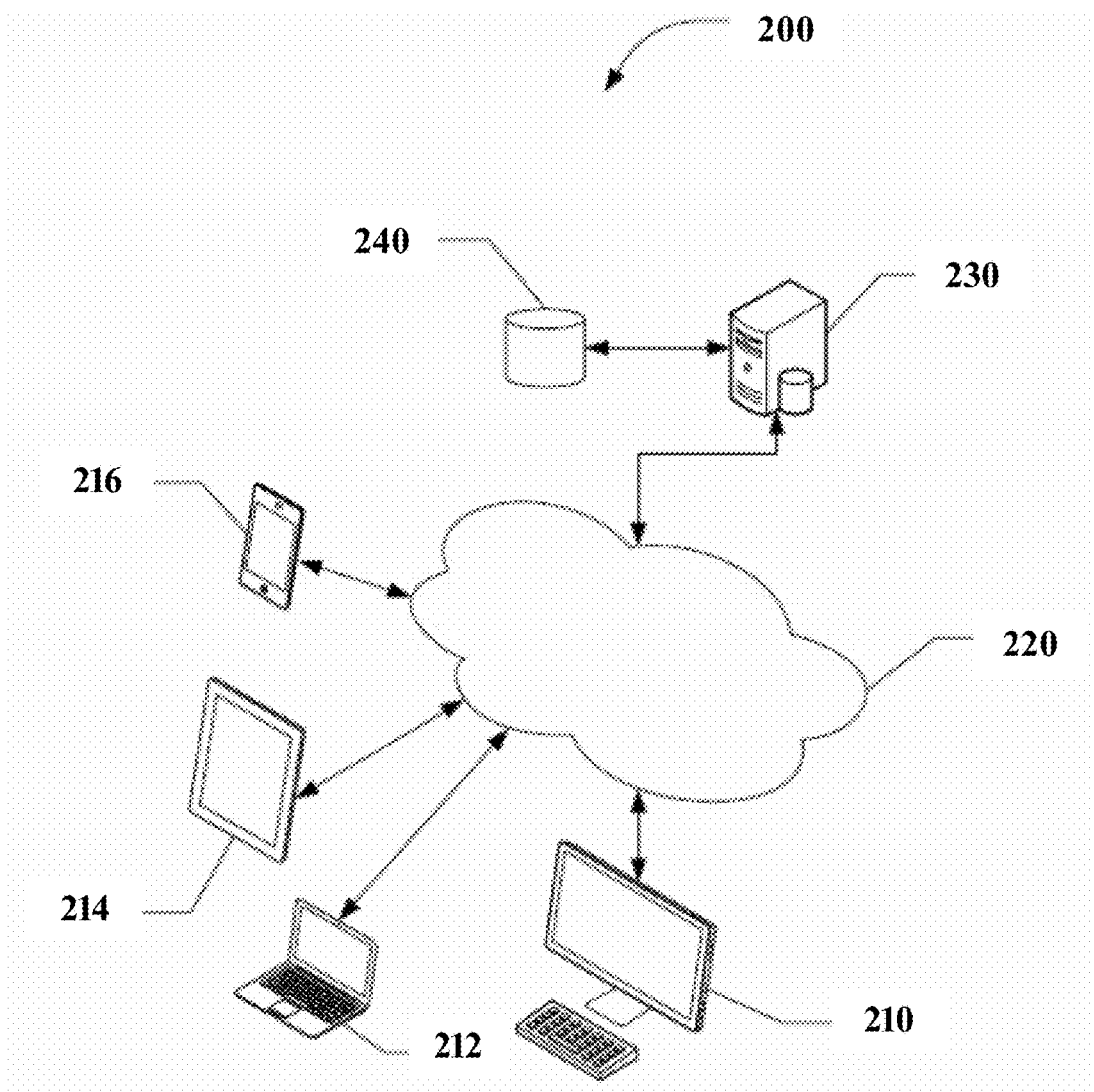
FIG. 2 is a block diagram illustrating a network environment that may be associated with one or more embodiments of the disclosed subject matter.

Turning now to FIG. 2, a block diagram illustrates a network of interconnected Programmable Devices 200, including Server 230 and an associated Datastore 240, as well as Desktop Computer System 210, Laptop Computer System 212, Tablet Computer System 214, and Mobile Phone 216. Any of these programmable devices may be the developer system or the target system shown as Computing Device 100 of FIG. 1. Network 220 that interconnects the programmable devices may be any type of network, wired or wireless, local or wide area, public or private, using any desired network communication protocols for transport of data from one system to the other. Although illustrated as a single Network 220, any number of interconnected networks may be used to connect the various programmable devices, and each may employ a different network technology.

In one example, Desktop Workstation 210 may be a developer system, distributing a graphic application to Server 230, which in turn may distribute the graphic application to multiple devices 212, 214, and 216, each of which may employ a different GPU as well as other different components. Upon launch of the graphic application, one action performed by the application can be creation of a collection of pipeline objects that may include state information, fragment shaders, and vertex shaders.

As noted above, embodiments of the subject matter disclosed herein include software. As such, a description of common computing software architecture is provided as expressed in a layer diagram in FIG. 3. Like the hardware examples, the software architecture discussed here is not intended to be exclusive in any way, but rather to be illustrative. This is especially true for layer-type diagrams which software developers tend to express in somewhat differing ways. In this case, the description begins with layers starting with the base hardware layer 395 illustrating hardware 340, which may include CPUs and GPUs or other processing and/or computer hardware. Above the hardware layer is the O/S kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer, exemplified by O/S services 350. O/S services may provide core O/S functions in a protected environment. In addition, O/S services shown in layer 385 may include frameworks for OPENGL 351, Metal 352, Software Raytracer 353, and a Pure Software Rasterizer 354 (OPENGL is a registered trademark of Silicon Graphic, Inc.). These particular examples all relate to graphic and/or graphic libraries and are chosen to illuminate the topic of many embodiments herein, which relate to graphic handling. These particular examples also represent graphic frameworks/libraries that may operate in the lower tier of frameworks, such that developers may use shading and graphic primitives and/or obtain fairly tightly coupled control over the graphic hardware. In addition, the particular examples named in layer 385 may pass their work product on directly to hardware or hardware drivers, which is software typically tightly coupled to the hardware.

Referring again to FIG. 3, OpenGL 351 represents an example of a well-known library and application programming interface (API) for graphic rendering including 2D and 3D graphic. Metal 352 also represents a published graphic library and framework, but it is lower level than OpenGL 351, supporting fine-grained, low-level control of the organization, processing, and submission of graphic and computational commands, as well as the management of associated data and resources for those commands. Software Raytracer 353 is software for creating image information based upon the process of tracing the path of light through pixels in the plane of an image. Pure Software Rasterizer 354 refers generally to software used to make graphic information such as pixels without specialized graphic hardware (e.g., using only the CPU). These libraries or frameworks shown within the O/S services layer 385 are only exemplary and intended to show the general level of the layer and how it relates to other software in a sample arrangement (e.g., kernel operations usually below and higher-level Applications Services 360 usually above). In addition, it may be useful to note that Metal 352 represents a published framework/library of Apple Inc. that is known to developers in the art.

Above the O/S services layer 385 is an Application Services layer 380, which includes SpriteKit 361, Scene Kit 362 Core Animation 363, and Core Graphic 364. The O/S services layer represents higher-level frameworks that are commonly directly accessed by application programs. In some embodiments of this disclosure the O/S services layer may include graphic-related frameworks that are high level in that they are agnostic to the underlying graphic libraries (such as those discussed with respect to layer 385). In such embodiments, these higher-level graphic frameworks are meant to provide developer access to graphic functionality in a more user- and developer-friendly way and to allow developers to avoid work with shading and graphic primitives. By way of example, SpriteKit 361 is a graphic rendering and animation infrastructure made available by Apple Inc. SpriteKit 361 may be used to animate two-dimensional (2D) textured images, or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphic rendering and animation infrastructure made available from Apple Inc. Core Animation 363 may be used to animate views and other visual elements of an application. Core Graphic 364 is a two-dimensional drawing engine from Apple Inc. Core Graphic 365 provides 2D rendering for applications.

Above the application services layer 380, there is the application layer 375, which may comprise any number and type of application programs. By way of example, FIG. 3 shows three specific applications: photos 371 (a photo management, editing, and sharing program), QUICKEN 372 (a financial management program), and iMovie 373 (a movie making and sharing program) (QUICKEN is a registered trademark of Intuit, Inc.). Application layer 375 also shows two generic applications 370 and 374, which represent the presence of any other applications that may interact with or be part of the disclosed embodiments. Generally, embodiments of the disclosed subject matter employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments of the invention may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment. Generally, many embodiments of this disclosure propose software activity and architecture in the layers between the hardware 340 and application 375 layers, shown by 397.

With reference again to FIG. 3, some embodiments may suggest the use of higher-level frameworks, such as those shown in application services layer 380. The high-level frameworks may perform intelligent analysis on particular graphic requests from application programs. The high level framework may then choose a specific hardware and/or a specific library or low-level framework to help process the request. In these embodiments, the intelligent analysis may provide for on-the-fly decision making regarding the best path for the graphic request to follow down to hardware.

Figure 4:
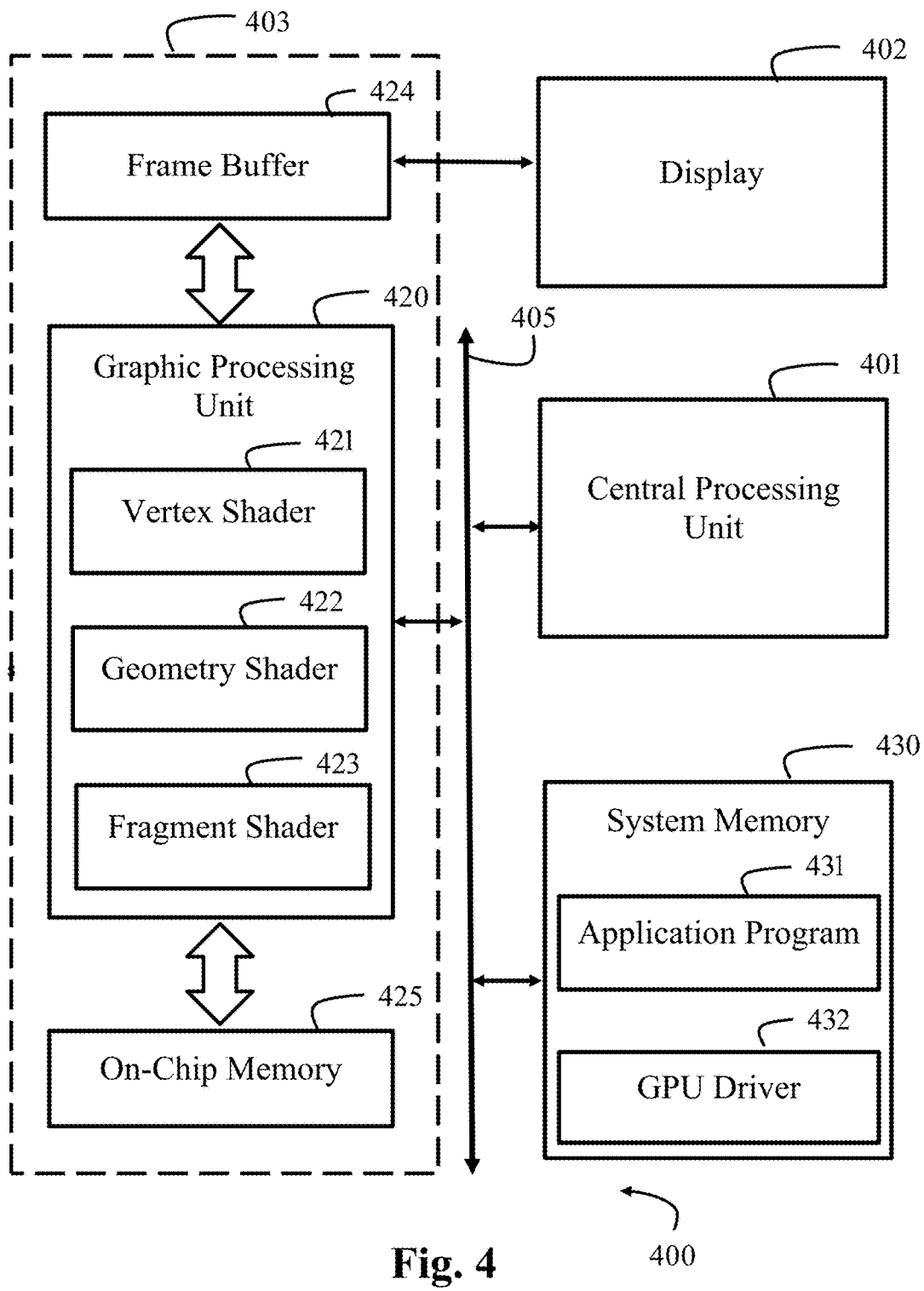
FIG. 4 is block diagram illustrating a target computer system for implementing one or more aspects of the disclosed subject matter.

Referring now to FIG. 4, a block diagram of Computing System 400 that illustrates a target computer system according to one embodiment is presented in more detail. Computing System 400 includes CPU 401, Graphic Processing System 403, Display 402, and System Memory 430. In the embodiment illustrated in FIG. 4, CPU 401 and Graphic Processing System 403 are included on separate integrated circuits (ICs) or packages. In other embodiments, however, CPU 401 and Graphic Processing System 403, or the collective functionality thereof, may be included in a single IC or package.

Data Bus 405 connects different elements of the Computing System 400 including CPU 401, System Memory 430, and Graphic Processing System 403. In an embodiment, System Memory 430 includes instructions that cause CPU 401 and/or Graphic Processing System 403 to perform the functions ascribed to them in this disclosure. More specifically, Graphic Processing System 403 can receive instructions transmitted by CPU 401 and processes the instructions to render and display graphic images on Display 402.

System Memory 430 may include Application Program 431 and GPU Driver 432. In an embodiment, Frame Buffer 424 is also located on System Memory 430. In an embodiment, Application Program 431 includes code written using an application programming interface (API). API includes a predetermined, standardized set of commands that are executed by associated hardware. Application Program 431 generates API commands to render an image by one or more shading engines of GPU 420 for display. GPU Driver 432 translates the high-level shading programs into machine code shading programs that are configured for each of the shading engines, e.g. Vertex Shader 421, Geometry Shader 422, and Fragment Shader 423.

Graphic Processing System 403 includes GPU 420, On-Chip Memory 425 and Frame Buffer 424. In one embodiment, CPU 401 transmits API commands to GPU 420 to render graphic data and store rendered images in Frame Buffer 424 to be displayed on Display 402. In an embodiment, a frame of graphic data is divided into multiple tiles.

Each tile may be rendered to On-chip Memory 425 space by GPU 420. Upon completion of all tiles of a frame, Frame Buffer 424 may output the image to Display 402.

GPU 420 can include a plurality of multiprocessors that are configured to execute a large number of threads in parallel. In an embodiment, each of the multiprocessors are configured as a shading engine that includes one or more programmable shaders. Each shader engine executes a machine code shading program to perform image rendering operations. In an embodiment according to FIG. 4, the shader engines can be Vertex Shader 421, Geometry Shader 422, and Fragment Shader 423. In an embodiment, Vertex Shader 421 handles the processing of individual vertices and vertex attribute data. Unlike Vertex Shader 421 that operates on a single vertex, the inputs received by Geometry Shader 422 are the vertices for a full primitive, e.g. two vertices for lines, three vertices for triangles, or single vertex for point. Fragment Shader 423 processes a fragment generated by the rasterization into a set of colors and a single depth value.

In one embodiment, deferred rendering techniques may be used to render images. In deferred rendering the step of shading pixels is decoupled from geometry computations. In the first stage, geometrical information (position vectors, color vectors, normal vectors and/or specular values) of an image is computed in a pixel-by-pixel basis and stored on On-chip Memory 425 (G-buffer). Next, using the stored geometrical information a deferred shader can operate on each of the pixels of the image just before displaying a scene.

The On-Chip Memory 425 is typically used to store shading data. On-chip Memory 425 provides fast access and reduces latency of the shading engines in the pipeline. However, On-chip Memory 425 takes up valuable die area and it is relatively expensive in terms of geometry.

Sometimes several rendering passes may be employed prior to committing content to Frame Buffer 424 for display. The multiple rendering passes are performed to incrementally move the data toward its displayable form. For instance, effects such as lighting, shadows, reflections, and specular illumination may be sequentially applied to the same graphic element. Alternatively, the output of a first rendering pass is transmitted to a second rendering pass for further computation. Typically, On-chip Memory 425 may be used to temporarily store rendering results of a rendering pass. This data is then backed up in System Memory 430. According to one embodiment, render results do not need to be backed up to System Memory 430 when data in On-chip Memory 425 does not need to be propagated from one rendering pass to the next. Reducing the usage of the system memory 430 not only improves bandwidth usage, it also saves memory space. Various embodiments described in further details below disclose methods for allocating system memory only where it is necessary.

Dependent Rendering Passes

Figure 5:
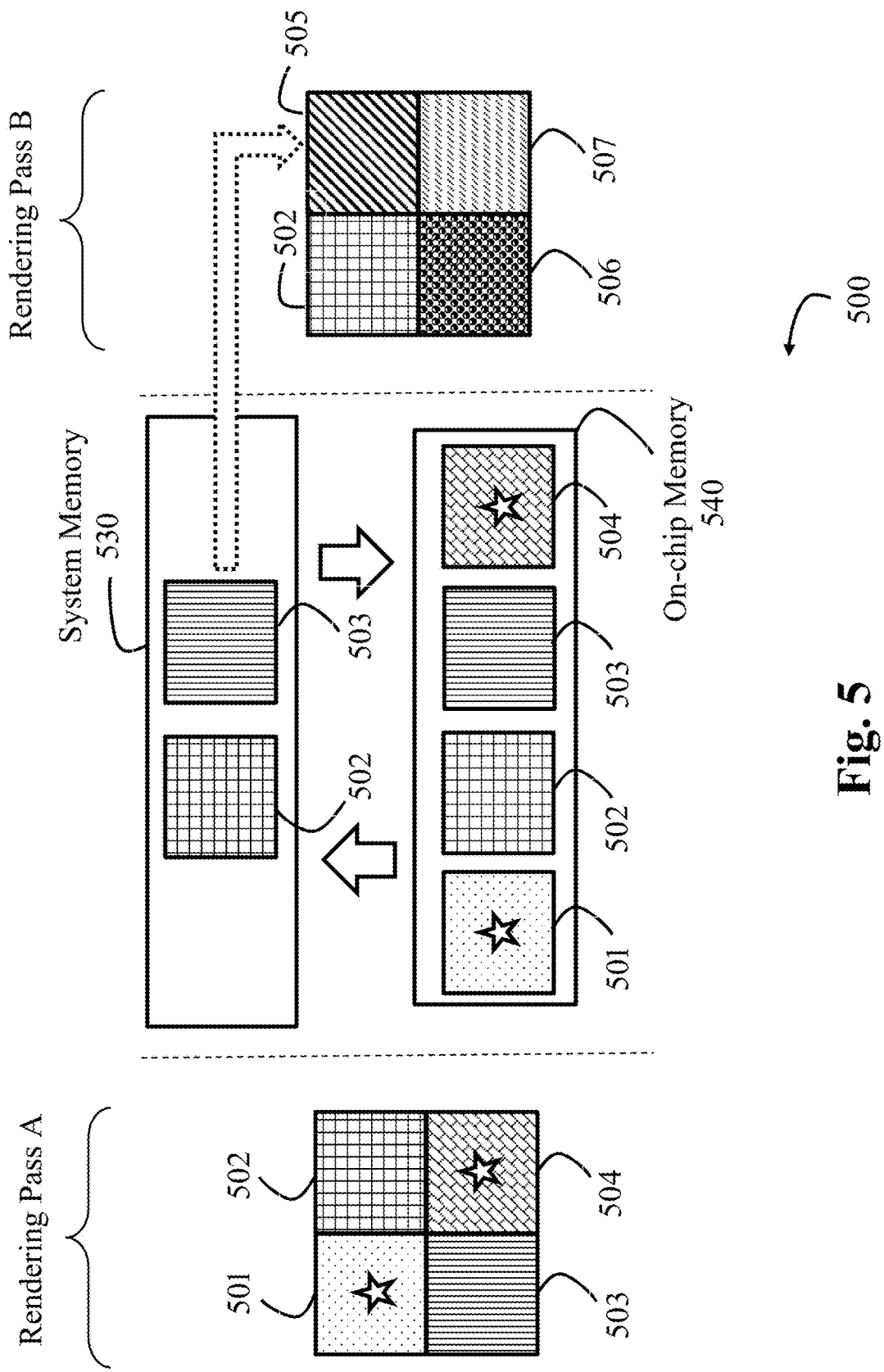
FIG. 5 is a block diagram illustrating a graphic processing operation by a sequence of dependent rendering passes.

FIG. 5 illustrates a graphic processing operation in terms of a sequence of dependent rendering passes. A rendering pass consists of all GPU commands targeting a particular buffer attachment (or set of attachments), without any other intervening GPU commands targeting another buffer attachment (or set of attachments). In an embodiment, several rendering passes may be needed before committing content to the frame buffer for display. Dependency between rendering passes is defined when the data generated by one rendering pass is accessed (i.e. stored to or loaded from) by a subsequent rendering pass.

In an embodiment, a frame of graphic data is divided into multiple tiles. Each tile may be rendered in one or more rendering passes by GPU 420 into one or more render targets. In general, a "render target" or a "buffer attachment" is an allocated memory space in which the GPU draws pixels for an image being rendered. On-chip memory 425 is usually large enough to hold data associated with one tile at each given time. An image may be composed of content from a plurality of render targets. For example, the GPU 420 may render a plurality of buffer attachments comprising texture data, color data, depth data, and stencil data and integrate the content to generate an output image. In one embodiment of the disclosed subject matter, a sequence of dependent rendering passes may be performed in processing a graphic element. Referring to FIG. 5, the dependency between two Rendering Passes A and B are illustrated. Rendering Pass A may render Buffer Attachments 501-504. The buffer attachments may hold certain type of graphic data. For example, Rendering pass A may render multiple attachments for color, depth, or stencil texture. In an embodiment, Rendering Pass B may rely on at least some of the outputs generated by Rendering pass A. The Render Targets that will be accessed by the subsequent rendering passes must be backed up in System Memory 530. For instance, in case of creating a shadow map of a scene, first a single depth map is generated. Subsequently, an image is created with multi-pass rendering, generating a shadow map for each light source. Therefore, the generated depth map must persist to be accessed by later rendering passes.

Initially, Rendering Pass A performs its computations in On-chip Memory 540. However, on-chip Memory 540 is not large enough to permanently store the rendered data. At each given time, a tile's worth of data is stored in On-chip Memory 540. Render targets are conventionally backed up from On-chip Memory 540 to System Memory 530. Intermediate data (e.g., depth map information) stored in System Memory 530 may be accessed during subsequent rending passes to add lighting, for example. However, there may be data backed up in System Memory 530 that is not required for subsequent rendering passes. The data that is rendered in a single pass, i.e. it is not loaded from or stored to by subsequent passes, does not need to be stored in System Memory 530. For example, a depth buffer is used to ensure the visibility of fragments, primitives and geometry is respected. So the depth buffer is needed to produce the right image but often times it is not needed by the subsequent rendering passes. A depth buffer can be an example of a render target with no need for a system memory allocation.

When single pass rendering targets only exist in On-chip Memory they are called "memory-less render targets" herein. In an embodiment, memory-less render targets may be flagged so no memory space in the system memory is allocated for them. In an embodiment, memory-less render targets are identified by programmers using API commands. The system may validate, at render pass creation, whether the memoryless flag is appropriate. In an embodiment, the graphic processing operation disclosed will automatically perform a dependency analysis of different rendering passes in order to determine whether a render target is appropriately flagged as memory-less render target. In an embodiment, memory-less render targets are identified on a per-attachment basis when creating a render target. The memory-less render target is then attached to a rendering pass as an attachment point.

Referring back to FIG. 5, Buffer Attachments 501 and 504 are flagged as memory-less render targets, i.e outputs of Rendering Pass A that will not be accessed by a subsequent rendering pass, e.g. Rendering Pass B. Buffer Attachments 501 and 504 are ready to be committed from On-chip Memory 540 to Frame Buffer 424 of FIG. 4 for display in a single rendering pass, Rendering Pass A. Rendering Pass B is a dependent rendering pass and requires one or more of the rendering targets generated by previous rendering passes. For example, Render Targets 502 and 503 are accessed by Rendering pass B, therefore, they are not previously flagged.

Referring to FIG. 5, while On-chip Memory 540 maintains all Buffer Attachments 501-504 in its storage, only buffer attachments that are not flagged (502 and 503) are backed up by System Memory 530. On the other hand, Rendering Pass B renders graphic data into render targets 502, 505, 506, and 507. As shown in FIG. 5, Render Target 502 is recycled from Rendering pass A. Rendering Pass B may be a compute pass or an accumulation pass and therefore continues the operation started by Rendering Pass A. Rendering pass B also depends on Render Target 503. Render Target 503 was not flagged as a memory-less render target because it provided an input required for Rendering pass B to generate Render Target 505. Render Target 503 can be a shadow map, for example, needed for Rendering pass B to calculate the lighting effect on each pixel. In other embodiments, Rendering pass B could perform post effect pixel processing operations such as motion blur or depth of field.

Conventionally, the amount of memory allocated for rendering operations are predetermined. Sometimes the allocated memory space is too small to complete the operation because predicting required memory space with perfect precision is difficult. Therefore, a sequence of partial rendering operations are adopted. The partial rendering results are frequently stored and accessed using system memory. Such operation is referred to as splitting the process by hardware, which is very expensive and undesirable.

For example, a system architecture may adopt two phases of execution: 1—vertex level processing and 2—pixel level processing. In the first step, all the geometry is classified into the system memory. The part of the system memory allocated for this purpose may also be called "pram buffer". The size of the pram buffer is determined in advance. In the second step, the geometry is read from the pram buffer and converted into pixels. After rasterization, shaders are invoked to shade the pixels. When the pram buffer size is not sufficient to complete the vertex processing, the system conventionally pauses and begins the pixel processing to open up memory space. Once the pram buffer opens up, the vertex processing resumes. Therefore, in these circumstances, we needed to store the intermediate render targets back in the system memory.

However, when render targets are flagged as memory-less render targets, no system backing memory is available. Memory-less render targets may not be committed to the partial rendering operations but instead a sufficient amount of memory space must be provided to ensure that the entire rendering operation is completed in one pass. In an embodiment, a more aggressive approach in allocation of memory space is adopted to ensure a sufficient amount of memory space is available to complete the operation in a single rendering pass. The predetermination of allocated memory may be based on similar operations previously performed by the GPU. In other embodiments, instead of allocating a large memory space in advance, a method of dynamically expanding memory space is employed.

Dynamic Memory Allocation

Figure 6:
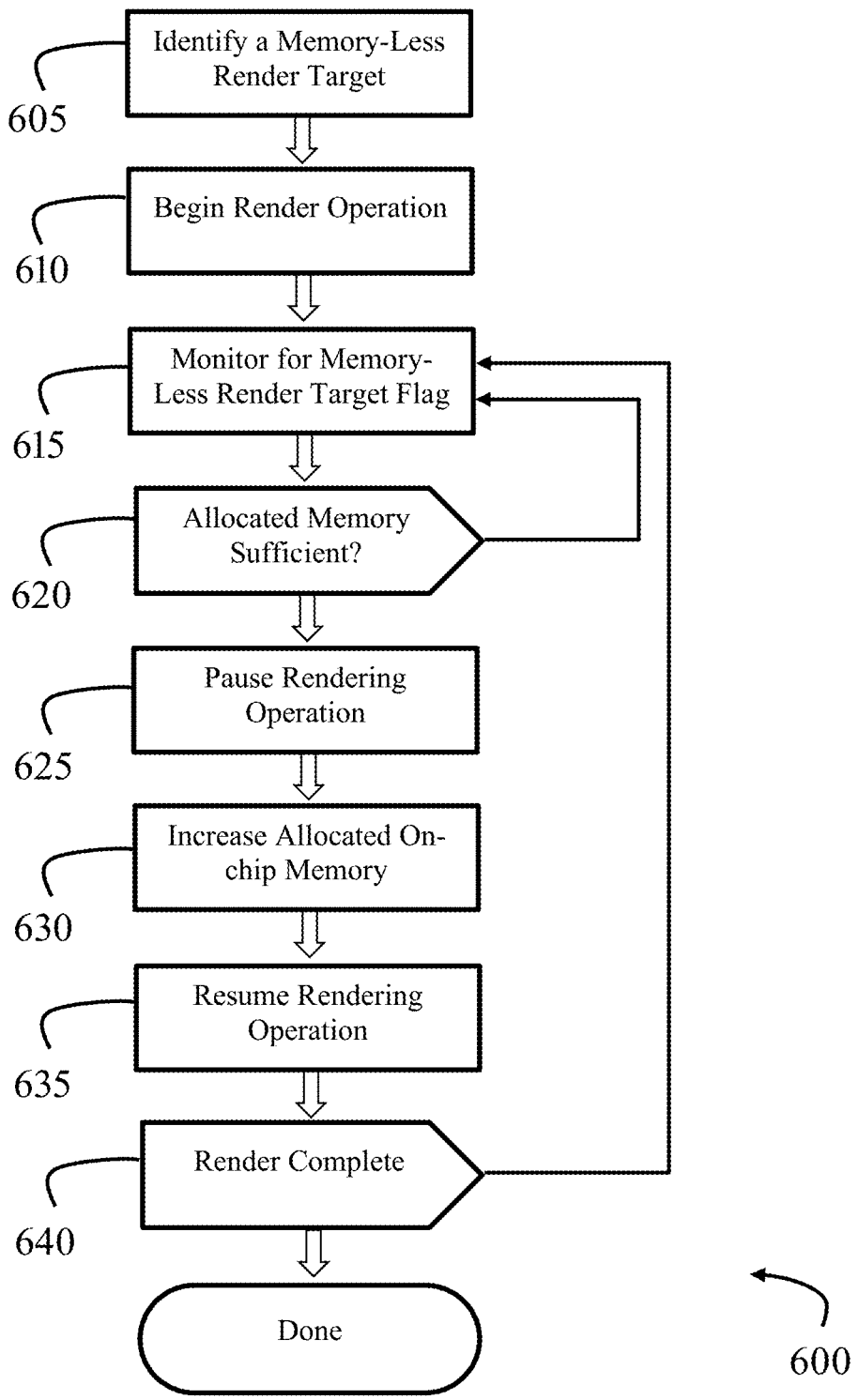
FIG. 6 is a flowchart illustrating an example operation for dynamically allocating memory for memory-less render targets.

Referring to FIG. 6, in one embodiment a method to dynamically allocate memory space for memory-less render targets is described according to flowchart 600. In an embodiment, the amount of memory is dynamically grown as more memory space is required during the rendering operation. At stage 605, a memory-less render target is identified. The identification of the memory-less render target may be based on a flag designated by a programmer through API. In response to the identification of a memory-less render target, the operation proceeds to stage 610

At stage 610, the GPU begins rendering buffer attachments. Rendering operation may be directed to any of lighting, shadows, reflections, and specular illumination of graphic processing.

At stage 615, the allocated memory for the memory-less render target is regularly monitored during the rendering operation. At stage 620, the remaining available memory space is compared to a specified threshold level. If the available memory space is sufficient, the operation proceeds back to stage 615. However, if the available memory space reaches the threshold level, the operation will proceed to stage 625.

Upon the determination that the available memory space is not sufficient to complete the rendering of the memory-less render target in one pass, at stage 625, the rendering operation may be paused. The allocated memory space is increased at stage 630 and subsequently the rendering operation is resumed at stage 635. Therefore, in such a scenario there is no need for storing intermediate results in a system memory. In an embodiment, the memory space increase must be sufficient to complete the rendering operation. In an embodiment, the duration of the pause at stage 625 is very short such that no interruption in the rendering operation occurs. In other embodiment, when the remaining memory space at stage 620 is determined to be within a threshold, the allocated memory space is increased without a pause, i.e. no step 625.

Upon receiving an indication from hardware at stage 620 on shortage of the allocated memory space, the firmware on GPU 403 in FIG. 4 communicates the need for additional memory space with CPU 401. Thereafter, the operating system allocates additional memory space to increase the existing memory. As such, the allocated memory grows just in time, without an interruption to the graphic processing operation.

In an embodiment, the memory increase is performed in increments. So after the rendering is resumed, the operation will proceed to stage 640 in order to determine whether the rendering operation is complete. If the rendering operation is not finished, the process goes back to stage 615 to monitor available memory space in on-chip memory. The operation is repeated as many time as necessary until the rendering operation is complete. When the rendering operation is complete then the next rendering operation may begin.

Multi-Sample Anti-Aliasing

In some embodiments of the disclosed subject matter, memory-less render targets may be used for multi-sample anti-aliasing (MSAA) data. Real-world objects that are being captured in images typically have continuous surfaces, smooth curves, and unbroken lines. However, in a display, images are displayed by integrating discrete pixels. Each pixel contains a uniform color and shape. As a result, sometimes representation of real-world objects by integrating pixels may result in images containing jagged edges.

In MSAA techniques, multiple samples (e.g., a factor of 4, 8, 16, or other value) may be generated for a single pixel. A "pixel", as used here, refers to a single fragment (point) in a graphic image. A "sample", as used here, may refer to a single value intended to represent the whole pixel. In an embodiment, a sample may be a color value representing the color of a pixel in the graphic image. In other examples, a sample may be a depth value. MSAA samples may then be combined (e.g., averaged) to generate a resolve attachment representing a final pixel value in the graphic image.

For instance, a 4k resolution screen (3840×2160 pixels) where each pixel is 4 bytes (e.g., a single RGBA value) requires 32 MB of storage. In a four sample MSAA mode, four Red, Green, Blue, and Alpha samples may be associated with each pixel. Therefore, 128 MB storage may be necessary. In addition to the color samples, there may be other sampling for depth and stencil. As such, MSAA data typically requires a larger memory space and higher bandwidth.

Conventionally, a system memory is allocated to back up both the MSAA sample attachments and the resolve attachment. However, it may be possible to render sample attachments and resolve attachments in a single pass. Upon the completion of the rendering pass, the outcome will be written into the resolve attachment and not any of the sample attachments. Therefore, in one embodiment, a memory-less flag may be used for MSAA sample attachments because they will not later be loaded from or stored to memory. As such, the MSAA sample attachments need only exist in on-chip memory while there will be system backing memory for resolve attachments.

Memory-less Render Targets

Figure 7:
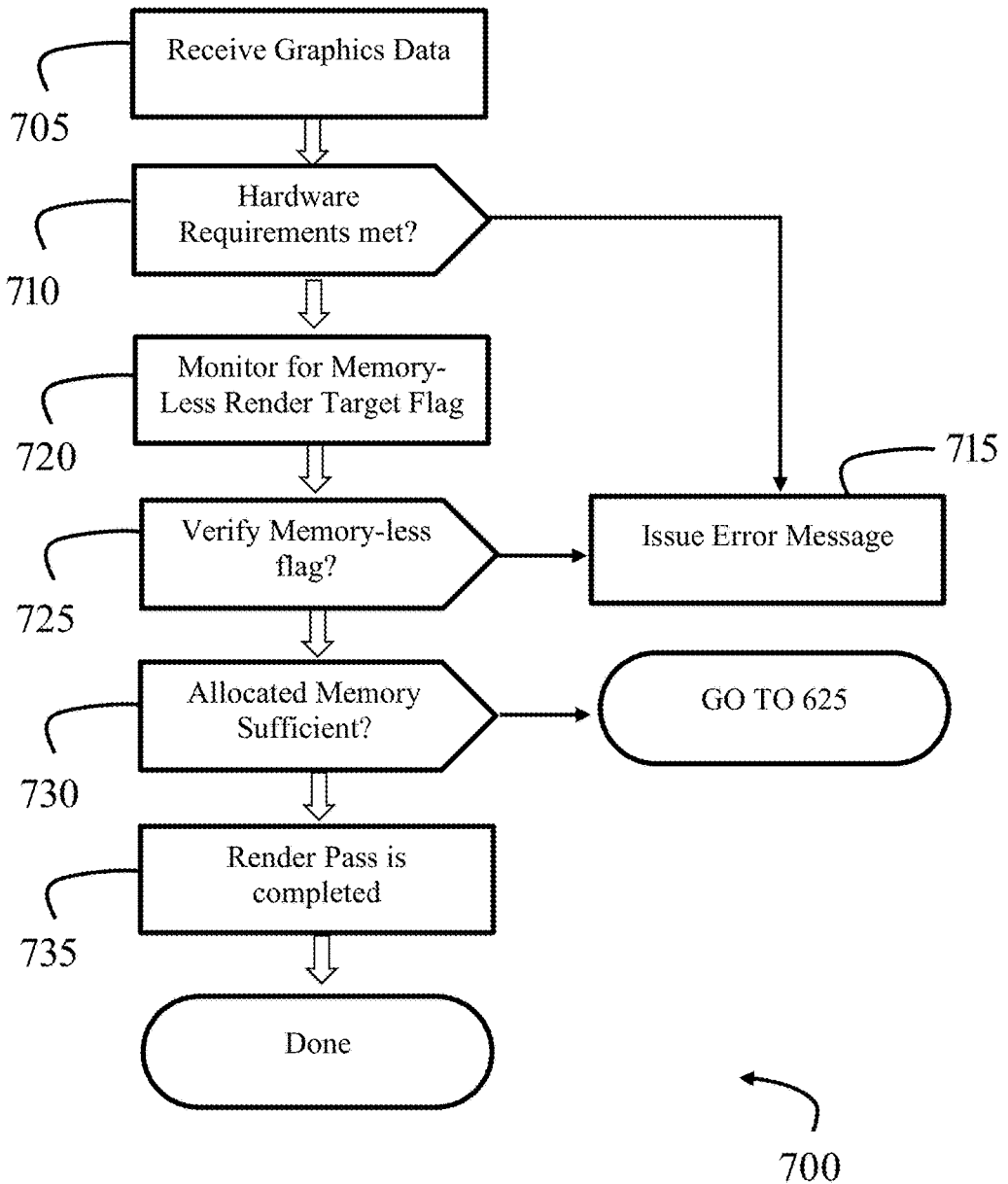
FIG. 7 is a flowchart illustrating an example operation of a graphic processing system according to an embodiment of the disclosed subject matter.

FIG. 7 is a flowchart illustrating an example operation of a graphic processing operation according to an embodiment of the invention. The illustrated flowchart will be described with reference to Computing System 400 from FIG. 4. During execution of Application Program 431 on CPU 401, GPU Driver 432 may command GPU 420 to render graphic data in order to generate an image for display.

At stage 705, graphic data is received by GPU 420 for processing. In an embodiment, a frame of graphic data may be divided into multiple tiles. Each tile may be rendered in one or more passes by GPU 420. For example, the GPU 420 may render a plurality of buffer attachments comprising texture data, color data, depth data, and stencil data and assemble the content to produce a final scene. Referring to FIG. 4, Application Program 431 uses API commands to define rendering passes for processing graphic elements by one or more shading engines in GPU 420.

At stage 710, Computing System 400 verifies whether hardware pre-requisites for a rendering pass are met. One pre-requisite may be that buffer attachments of the rendering passes must fit within the allocated space in On-chip Memory 425. In an embodiment, if a rendering pass fails to be compatible with the system hardware, an error message is issued at stage 715. If the rendering pass requirements are compatible with available hardware then the system will proceed with creating render targets.

At stage 720, GPU 420 receives an instruction to not create a memory system backing for a render target (memory-less render target). In an embodiment, memory-less render targets are identified on a per-attachment basis. In an embodiment, users identify buffer attachments that do not need to be saved in System Memory 530 using API commands.

At stage 725, GPU 420 determines whether memory-less flag was properly designated to the render targets. The memory-less render targets will only exist in On-chip memory 425. Therefore, GPU 420 must make sure no other subsequent rendering pass relies on them. The buffer attachments that are rendered in one pass may not require system backing memory. Therefore, buffer attachments that will be loaded from or stored to by the subsequent rendering passes may not be designated as memory-less render targets. If the memory-less flag is incorrectly designated to the render target, an error message may be issued to the user at stage 715. If memory-less flag is correctly designated to the render target, the system will proceed with creating the render target in On-chip Memory 425.

At stage 730, it is determined whether the allocated system memory (e.g., pram buffer) for rendering the memory-less render target is sufficient. As explained previously with reference to FIG. 6, this step ensures no partial rendering occurs for render targets designated as memory-less render targets. If the allocated memory is not sufficient, the operation proceeds to stage 625 of FIG. 6 to dynamically expand the memory. However, if the allocated memory is sufficient, the operation proceeds to stage 735.

Finally, at stage 735, the buffer attachments are fully rendered. In case of the memory-less render targets, the buffer attachments may be rendered in a single rending pass. The render targets are ready to be committed from On-chip Memory to the frame buffer for display.

Merging Rendering Passes

Figure 8:
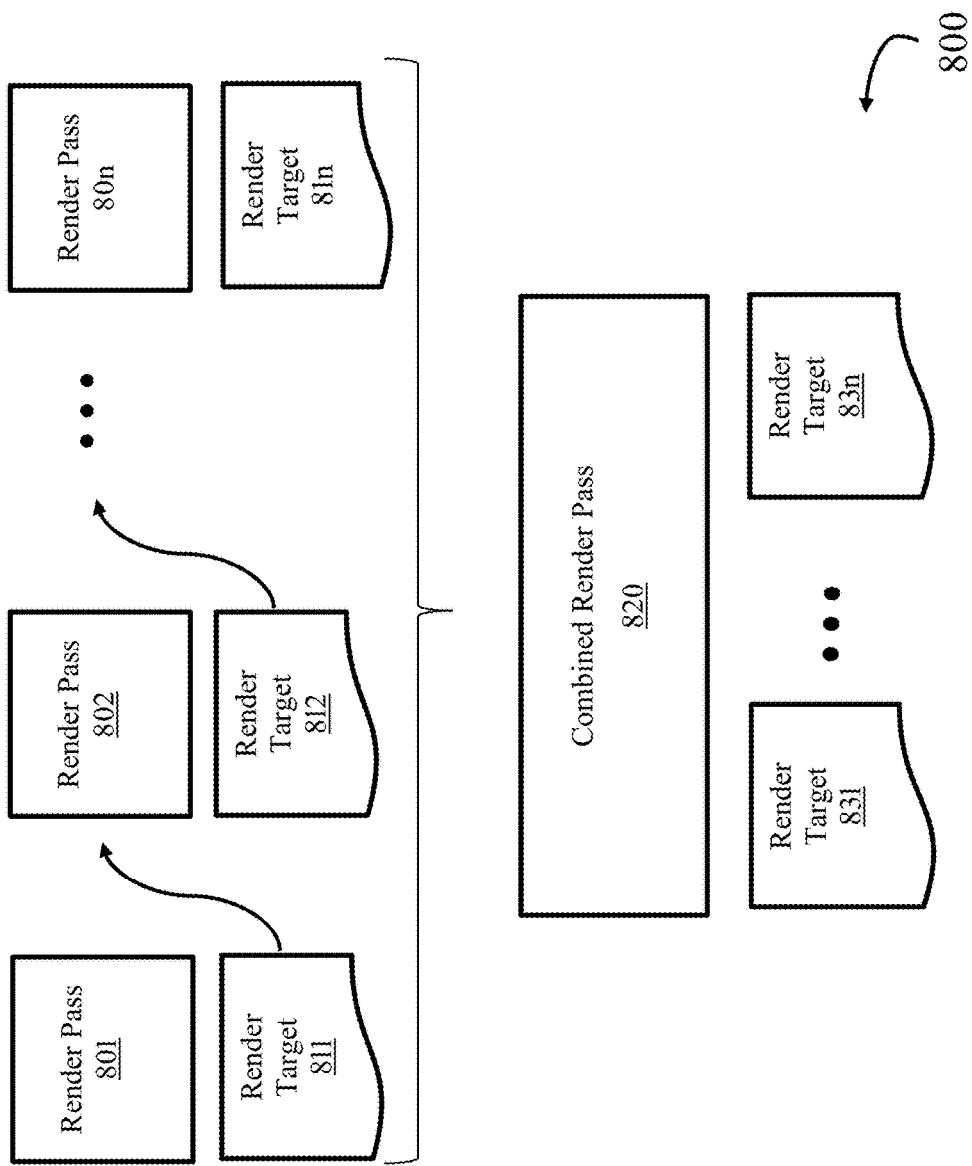
FIG. 8 is a block diagram illustrating creation of a combined rendering pass according to an embodiment of the disclosed subject matter.

As previously explained, sometimes several rendering passes may be employed prior to committing a frame buffer's content for display. The multiple rendering passes may be employed to incrementally move the data toward its displayable format. For example, referring to FIG. 8, rendering a user interface to a display may include multiple dependent rendering passes 801 to 80n, where n is any integer above 1. Rendering Pass 801 generates Render Target 811. While Render Target 811 may not be committed to a frame buffer immediately for display, it can provide the intermediate data required for Rendering Pass 802 to generate Render Target 812.

Switching between several passes in an operation can be expensive and inefficient. Every time the system switches from one rendering pass to another, it stops rendering to the frame buffer and instead renders a texture that is used by subsequent passes. To increase the bandwidth and provide for faster performance, embodiments of this disclosure describe reducing the number of rendering passes. Referring back to FIG. 8, a plurality of rendering passes may be merged to generate Combined Rendering Pass 820. Combined Rendering Pass 820 renders into multiple render targets including Render Targets 831 to 83n, where n is an integer above one. In an embodiment, a rendering pass can include up to 8 color attachments, 1 depth buffer, and 1 stencil buffer. At least one of the multiple Render Targets 831 to 83n may be designated to store intermediate data. The intermediate data may be required to generate the output of the rendering pass but is never committed to frame buffer for display.

In the example of a user interface noted above, Combined Rendering Pass 820 could render the user interface in one pass. Initially, Render Target 831 may capture intermediate data. In other embodiments, there may be multiple render targets designated to capture the intermediate data. Combined Rendering Pass 820 may read from Render Target 831 while it is being written on to simultaneously. Therefore, to generate the output, Combined Rendering Pass 820 accesses the intermediate data captured by Render Target 831 (pixel-by-pixel) to perform other graphic operations and generate the output render target, for example, Render Target 832. Render Target 832 may then be committed to the frame buffer for displaying the user interface.

In an embodiment, the one or more render targets used to capture intermediate data may be flagged as memory-less render targets. In the example above, Render Target 831 captures the intermediate data, which is used to generate the user interface rendered by Combined Rendering Pass 820. However, Render Target 831 is never accessed again by the subsequent rendering passes and therefore does not need to be backed up in the system memory. In this way, combining multiple rendering passes into one rendering pass provides faster and more efficient processing. In addition, designating the intermediate render target(s) (i.e., render targets in which intermediate results are stored) as memory-less render targets saves memory space.

Rendering Rounded Corner Icons on a User Interface

Figure 9A:
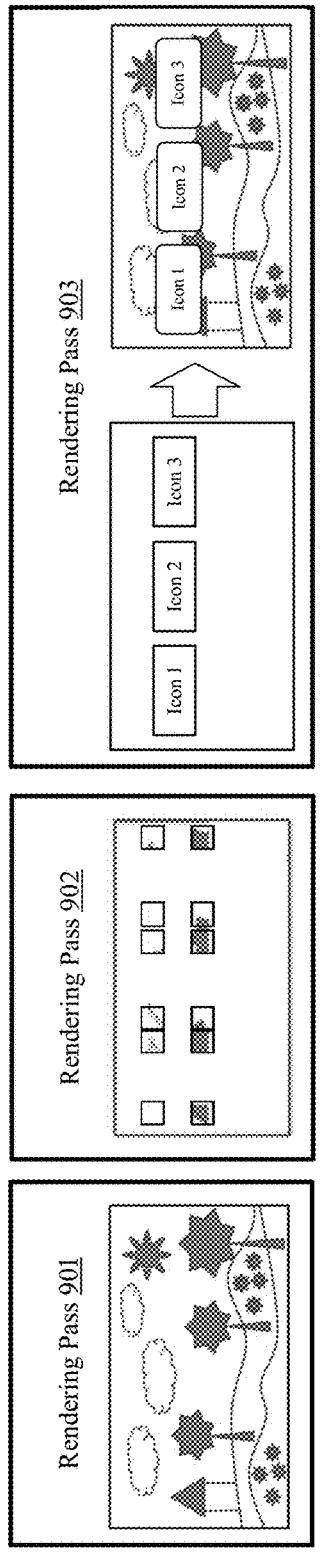
FIGS. 9A and 9B are block diagrams illustrating graphic operations directed at generation of rounded icons on a user interface according to embodiments of the disclosed subject matter.
Figure 9B:
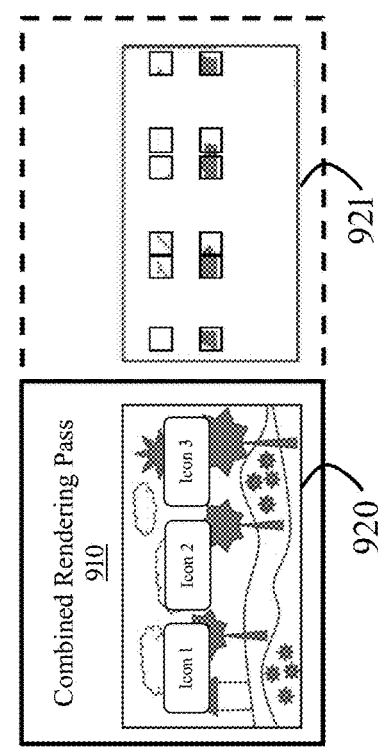

Referring to FIGS. 9A and 9B, other embodiments are described for rendering rounded corner icons in a user interface. To render rounded corner icons on a user interface, multiple graphic processing operations must be performed. First, the background of the icons can be produced and the corresponding location of the icons specified. Then, the icons in their rectangular format may be generated. Finally, the background and the icons can be combined.

Referring to FIG. 9A, every graphic processing operation described above can be implemented by a separate rendering pass. For example, Render Pass 901 captures the background of the icons. In one embodiment, the background consists of different layers. For example, the bottom most layer could be the desktop. Subsequently, Rendering Pass 902 captures the portion of the rendered background that corresponds to the icons' corners. These captured portions function as a cap to clip the square corners of the icons to a rounded shape. Finally, Rendering Pass 903 renders the icons in their square form and then generates the rounded corner icons by combining the background with the square icons. In one particular embodiment, Rendering Pass 903 determines whether each pixel is inside or outside the square icons. Pixels outside the square are sampled from the background and pixels inside the square are sampled from the square icon.

However, in the method described above, several dependent rendering passes are used. The render targets are not committed to the frame buffer until all rendering passes are performed. The render targets generated at each step are consumed subsequently by a later a rendering pass, therefor it necessitates system memory.

To improve the efficiency, several of the graphic processing operations described above with respect to FIG. 9A could be combined into a single rendering pass. Referring to FIG. 9B, Combined Rendering Pass 910 renders multiple render targets (at least Render Targets 920 and 921). Rendering Pass 910 captures the background in Render Target 920 and draws the icons in their square form on top of the background. Render Target 921 may be used by Combined Rendering Pass 910 to store the portion of the background corresponding to the corners of the icons. Finally, Combined Rendering Pass 910 reads the intermediate data from Render Target 921 onto Render Target 920 for the appropriate pixels in order to generate the outcome.

In an embodiment, Combined Rendering Pass 910 generates a background, specifies the locations corresponding to the corners of the icons, and finally blends or combines the icons with the background in a single pass. Combined Rendering Pass 910 merges Rendering Passes 901, 902, and 903. In one embodiment, at least one render target may be designated by Combined Rendering Pass 910 to store intermediate data. Here, Render Target 921 is used as a scratch pad to save the pixel values corresponding to where the corners of the icons are located. Render Target 921 can be flagged as a memory-less render target since it does not require system backing memory.

In an embodiment, the icons may be combined with the background layers using programmable blending. In one embodiment, the square icons are drawn onto Render Target 920 on top of the background. To clip the icons' square corners, Combined Rendering Pass 910 reads pixel values one by one from Render Target 921. If the pixel belongs to a position outside the icons, it can be placed as a top layer above the square icons on Render Target 920, creating a rounded shape. If the pixel belongs to a position within the icons, the value is obtained from Render Target 920. Render Target 920 is then committed (e.g., stored) to the frame buffer for display.

In one or more embodiments, Render Target 921 can be flagged as a memory-less render target therefore requiring no system backing memory. Since Render Target 921 only exists in on-chip memory in such an embodiment, no memory traffic goes beyond the on-chip memory therefore improving the efficiency of the graphic operation.

Combined Rendering Pass to Perform Multiple Graphic Operations

Figure 10:
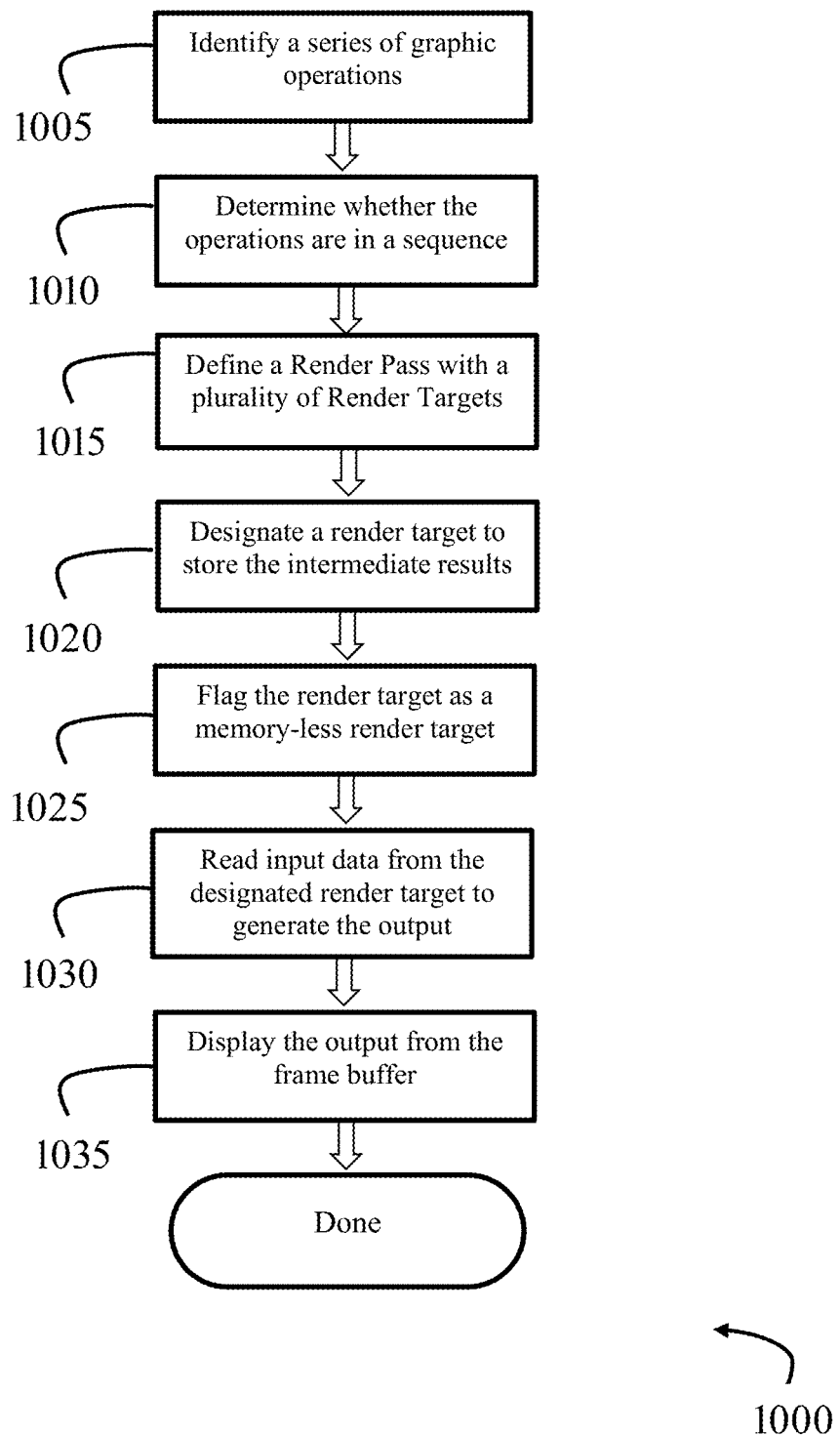
FIG. 10 is a flowchart illustrating an example method of a graphic processing operation according to an embodiment of the disclosed subject matter.

Referring to FIG. 10, flowchart 1000 illustrates a graphic processing operation according to one embodiment of the disclosed subject matter. At stage 1105, a series of graphic processing operations are identified. The graphic processing operations could be directed at any graphic effect such as lighting, shadows, and reflections. In an embodiment, the series of graphic processing operations could be directed at rendering a user interface on a display. For example, the series of graphic processing operations could be directed at generating rounded corner icons on a user interface.

At stage 1010, it is determined whether the series of graphic processing operations are in a sequence. A series of operations are in a sequence if the output generated by a first operation is consumed by the subsequent operation(s). For example, in displaying a user interface, a first operation is in series or sequence with a second operation, when the second operation receives and uses the intermediate result generated by the first operation. Dependent rendering passes as described previously in this disclosure are in a sequence.

At stage 1015, a series of graphic processing operations are defined or designated to be performed in a single rendering pass. In an embodiment, the single rendering pass renders graphic data into multiple render targets. The render targets could be, for example, color attachments, depth buffers, or stencil buffers.

At stage 1020, at least one of the multiple render targets may be designated to store intermediate data. The intermediate data is graphic data required to complete the rendering pass. Such a render target, however, will be consumed within the same rendering pass and will not be accessed again by any subsequent rendering pass. Because of this, the render target can be flagged as a memory-less render target at stage 1025. As such, no system backing memory need be allocated for the render target. In some embodiments, a plurality of render targets may be designated to store intermediate data.

At stage 1030, the one or more render targets designated to store intermediate data may be accessed to generate the output. In one embodiment, each pixel of a render target designated to hold intermediate data may be sampled based on its x-y location coordinates. In an embodiment, only the pixel corresponding to the x-y coordinate need be sampled and not the neighboring pixels. Sampled pixels are combined with data from other render targets to generate the output. At stage 1035 the output is committed (e.g., stored) to the frame buffer for display.

Figure 11:
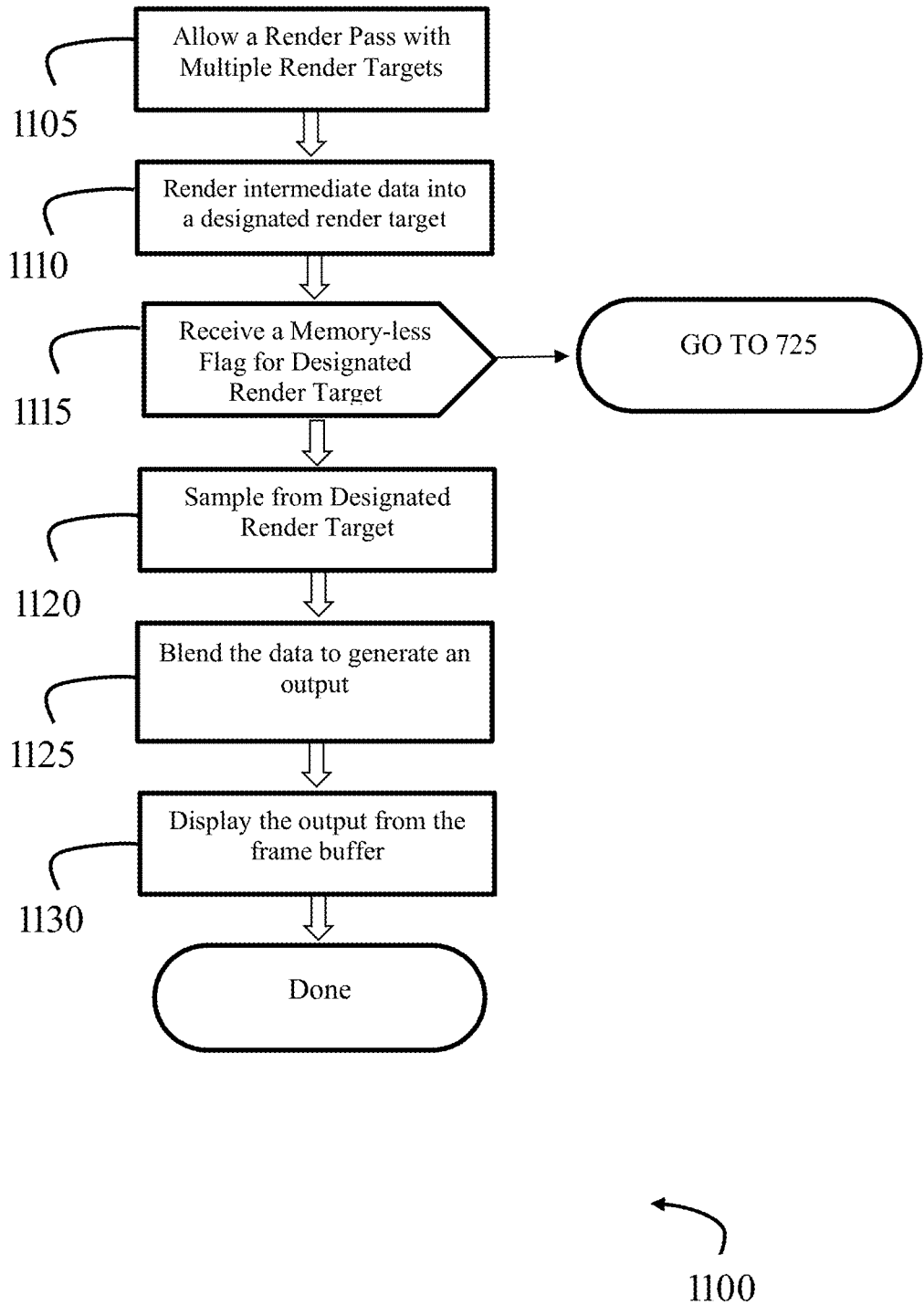
FIG. 11 is flowchart illustrating an example operation of a graphic processing system according to an embodiment of the disclosed subject matter.

Referring to FIG. 11, flowchart 1100 illustrates an example operation of a graphic processing system according to an embodiment of the disclosed subject matter. The graphic processing system may include a programmable GPU. The programmable platform may be configured to perform a series of graphic operations in a single rendering pass with a plurality of render targets at stage 1105. The rendering pass can be defined to perform a series of graphic processing operations. Referring to FIG. 9, the render target can be directed to generate rounded corner icons on a user interface.

At stage 1110, the programmable platform can be configured to designate at least one of the plurality of render targets for storing intermediate data. While the intermediate data is never saved to the frame buffer for display, it is necessary for the rendering pass to generate the desired output. In an embodiment, a plurality of rendering passes are designated to store intermediate data. In one embodiment, the designated render targets store geometric properties such as depth, position, surface normal information, and specular coefficients. In another embodiment, the designated render target may store lighting properties. In the example of FIG. 9, Render Target 921 is designated to capture that section of the background corresponding to the corners of the icons.

In an embodiment, the programmable platform receives an indication that the designated render target is a memory-less render target. One procedure with regards to verification of the memory-less flag is explained with reference to FIG. 7. Once the memory-less flag is identified, the operation continues from stage 725 of FIG. 7. If the accuracy of the memory-less flag is verified, then the designated render target only exists in on-chip memory without a system backing memory.

At stage 1125, the graphic processing system starts sampling from the designated render target. The samples from the designated render target may be combined (e.g., blended) with data from other render target(s) at stage 1125 to generate the output. In an embodiment, the blending occurs pixel-by-pixel, where at each given time the pixel addressed by a specific x-y location coordinate is sampled. In the example of FIG. 9, every pixel is evaluated to determine whether it is located inside or outside the icons. If the pixel is inside the icon, the texture particular to the icon is sampled from the render target generated by previous rendering. If the pixel is outside an icon, the designated render target is sampled from the background. Therefore, for any given pixel in the blended output, the designated render target is sampled at the corresponding location. Finally, at stage 1130 the output render target is committed to the frame buffer for display.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed:

1. A graphic processing method, comprising:
    executing a plurality of graphic processing operations in a single rendering pass, wherein the single rendering pass includes a plurality of render targets;
    receiving an indication to not allocate backing memory in a system memory for a first render target of the plurality of render targets;

rendering a first result of executing the plurality of graphic processing operations into the first render target, wherein rendering the first result into the first render target comprises rendering the first result into an on-chip memory internal to a graphics processing unit;

rendering a second result of executing the plurality of graphic processing operations into a second render target of the plurality of render targets, wherein the second render target has allocated backing memory in the system memory;

combining the first result with the second result to generate a combined result; and storing the combined result to a frame buffer memory.

2. The method of claim 1, wherein the plurality of graphic processing operations are in a sequence.

3. The method of claim 1, wherein the plurality of graphic processing operations are directed at displaying at least one rounded corner icon on a display.

4. The method of claim 3, wherein the first render target captures portions of a background corresponding to at least one corner of the at least one rounded corner icon.

5. The method of claim 4, wherein combining the first result with the second result comprises determining, for each pixel of the combined result, whether the pixel is obtained from the first render target or the second render target.

6. The method of claim 1, wherein the combined result is rendered into the second render target.

7. The method of claim 1, wherein the plurality of graphic processing operations are directed at displaying a user interface on a display.

8. The method of claim 1, wherein the first result rendered into the on-chip memory comprises a result that is not accessed by a subsequent rendering pass.

9. The method of claim 8, wherein the second result that has allocated the backing memory in the system memory comprises a result that is accessed by the subsequent rendering pass.

10. The method of claim 1, wherein the first result rendered into the on-chip memory comprises data associated with a single tile.

11. The method of claim 1, wherein rendering the first result of executing the plurality of graphic processing operations into the first render target further comprises determining that the first result meets a hardware prerequisite for the graphics processing unit.

12. A non-transitory computer readable medium comprising instructions stored thereon to cause one or more processors to:

execute a plurality of graphic processing operations in a single rendering pass, wherein the single rendering pass includes a plurality of render targets;

receive an indication to not allocate backing memory in a system memory for a first render target of the plurality of render targets;

render a first result of executing the plurality of graphic processing operations into the first render target, wherein the instructions to render the first result into the first render target comprise instructions to render the first result into an on-chip memory internal to a graphics processing unit;

render a second result of executing the plurality of graphic processing operations into a second render target of the plurality of render targets, wherein the second render target has allocated backing memory in the system memory;

combine the first result with the second result to generate a combined result; and store the combined result to a frame buffer memory.

13. The non-transitory computer readable medium of claim 12, wherein the plurality of graphic processing operations are executed in a sequence.

14. The non-transitory computer readable medium of claim 12, wherein the plurality of graphic processing operations are directed at displaying at least one rounded corner icon on a display.

15. The non-transitory computer readable medium of claim 14, wherein the first render target captures portions of a background corresponding to at least one corner of the at least one rounded corner icon.

16. The non-transitory computer readable medium of claim 12, wherein the combined result is rendered into the second render target.

17. The non-transitory computer readable medium of claim 12, wherein the first result rendered into the on-chip memory comprises a result that is not accessed by a subsequent rendering pass.

18. The non-transitory computer readable medium of claim 17, wherein the second result that has allocated the backing memory in the system memory comprises a result that is accessed by the subsequent rendering pass.

19. The non-transitory computer readable medium of claim 12, wherein the first result rendered into the on-chip memory comprises data associated with a single tile.

20. The non-transitory computer readable medium of claim 12, wherein rendering the first result of executing the plurality of graphic processing operations into the first render target further comprises determining that the first result meets a hardware prerequisite for the graphics processing unit.

21. An apparatus, comprising:

a frame buffer memory;

a central processing unit (CPU) coupled to the frame buffer memory;

a graphics processing unit (GPU) coupled to the frame buffer memory and the CPU, wherein the GPU further includes an on-chip memory internal to the GPU and physically distinct from the frame buffer memory; and a system memory coupled to the frame buffer memory, the CPU and the GPU, the system memory further comprising program code configured to cause the CPU and GPU to:

execute a plurality of graphic processing operations in a single rendering pass, wherein the single rendering pass includes a plurality of render targets, receive an indication to not allocate backing memory in the system memory for a first render target of the plurality of render targets, allocate the first render target to the on-chip memory responsive to the indication, render a first result of executing the plurality of graphic processing operations into the first render target, wherein rendering the first result of executing the plurality of graphic processing operations into the first render target comprises rendering the first result into the on-chip memory, render a second result of executing the plurality of graphic processing operations into a second render target of the plurality of render targets, wherein the second render target has allocated backing memory in the system memory, combine the first result with the second result to generate a combined result, and store the combined result to the frame buffer memory.

22. The apparatus of claim 21, wherein the plurality of graphic processing operations are directed at displaying at least one rounded corner icon on a display.

23. The apparatus of claim 22, wherein the first render target captures portions of a background corresponding to at least one corner of the at least one rounded corner icon.

24. The apparatus of claim 23, wherein the code configured to cause the CPU and GPU to combine the first result with the second result to generate a combined result further comprises code configured to cause the CPU and GPU to:
   determine, for each pixel of the combined result, whether the pixel is obtained from the first render target or the second render target.

25. The apparatus of claim 21, wherein the combined result is rendered into the second render target.

26. The apparatus of claim 21, wherein the first result rendered into the on-chip memory comprises a result that is not accessed by a subsequent rendering pass.

27. The apparatus of claim 26, wherein the second result that has allocated the backing memory in the system memory comprises a result that is accessed by the subsequent rendering pass.

28. The apparatus of claim 21, wherein the first result rendered into the on-chip memory comprises data associated with a single tile.

29. The apparatus of claim 21, wherein rendering the first result of executing the plurality of graphic processing operations into the first render target further comprises determining that the first result meets a hardware prerequisite for the graphics processing unit.

* * * * *

UNITED STATES PATENT AND TRADEMARK OFFICE
CERTIFICATE OF CORRECTION

PATENT NO.        : 10,825,129 B2                    Page 1 of 1
APPLICATION NO.   : 15/467268
DATED             : November 3, 2020
INVENTOR(S)       : Bartosz Ciechanowski et al.

It is certified that error appears in the above-identified patent and that said Letters Patent is hereby corrected as shown below:

In the Claims

Claim 2, at Column 17, Line 16, insert -- executed -- after -- are --

Signed and Sealed this
Eighth Day of December, 2020

Andrei Iancu
*Director of the United States Patent and Trademark Office*